United States Patent [19]
Lawther

[11] Patent Number: 5,552,848
[45] Date of Patent: Sep. 3, 1996

[54] FILM TRANSPORT MECHANISM FOR CAMERA

[75] Inventor: Joel S. Lawther, Rochester, N.Y.

[73] Assignee: Eastman Kodak Company, Rochester, N.Y.

[21] Appl. No.: 367,660

[22] Filed: Jan. 3, 1995

[51] Int. Cl.$^6$ .............................. G03B 17/42; G03B 1/00
[52] U.S. Cl. .......................... 354/206; 354/213; 354/214
[58] Field of Search .................................... 354/206, 213, 354/214, 215

[56] References Cited

U.S. PATENT DOCUMENTS

| | | | |
|---|---|---|---|
| 4,171,893 | 10/1979 | Kawazoe | 354/173 |
| 4,213,687 | 7/1980 | Hattis et al. | 354/213 |
| 4,309,097 | 1/1982 | Stemme et al. | 354/173 |
| 4,437,749 | 3/1984 | Ehgartner et al. | 354/214 |
| 4,477,163 | 10/1984 | Matsumoto et al. | 354/173.11 |
| 4,492,446 | 1/1985 | Zawodny et al. | 354/173 |
| 4,540,261 | 9/1985 | Matsumoto et al. | 354/173.11 |
| 4,914,462 | 4/1990 | Pagano | 354/213 |
| 4,980,710 | 12/1990 | Harvey | 354/173.1 |

*Primary Examiner*—Michael L. Gellner
*Assistant Examiner*—Daniel Chapik
*Attorney, Agent, or Firm*—Roger A. Fields

[57] ABSTRACT

A film transport mechanism for a camera comprises drive means for advancing a filmstrip beginning with a leading end portion along a defined film path from a film cartridge, and a perforation sensor for detecting a turn-around perforation in a trailing end portion of the filmstrip to initiate return of the filmstrip along the defined film path to the film cartridge. The perforation sensor has a sensing position in the defined film path to be received in the turn-around perforation when the turn-around perforation is advanced to the perforation sensor. A film divertor has a diverting position in the defined film path to direct a forward edge of the leading end portion of the filmstrip over the perforation sensor. A film presence sensor is located to sense the forward edge of the filmstrip after the film divertor directs the forward edge over the perforation sensor, for retracting the film divertor from the defined film path to allow the perforation sensor to be received in the turn-around perforation.

8 Claims, 4 Drawing Sheets

FILM TRANSPORT MECHANISM FOR CAMERA

CROSS-REFERENCE TO RELATED APPLICATION(S)

Reference is made to commonly assigned copending applications Ser. No. 08368,688, entitled FILM TRANSPORT MECHANISM FOR CAMERA and filed Jan. 3, 1995 in the name of Joel S. Lawther, and Ser. No. 08/368,463, entitled FILM TRANSPORT MECHANISM FOR CAMERA and filed in Jan. 4, 1995 the name of Joel S. Lawther, each of which are assigned to the assignee of this application.

FIELD OF THE INVENTION

The invention relates generally to the field of photography, and in particular to a film transport mechanism for a camera. More specifically, the invention relates to a film transport mechanism capable of returning a filmstrip automatically to a film cartridge after the last exposure in a camera.

BACKGROUND OF THE INVENTION

Typically in some cameras the film transport mechanism is motorized. In operation, a leading end portion of the filmstrip protruding from a light-tight film cartridge loaded in the camera is attached automatically to a film take-up spool. The take-up spool is rotated after each exposure to advance successive frames of the filmstrip from the cartridge, across the focal plane of a taking lens, and onto the take-up spool. Each time the take-up spool is rotated, an unexposed frame of the filmstrip is positioned in the focal plane of the taking lens and an exposed frame is wound onto the take-up spool. When all of the available frames have been exposed, a trailing end portion of the filmstrip remains attached to a supply spool inside the cartridge. This end-of-film condition produces a sudden increase in the film tension and in the motor current as the take-up spool attempts to withdraw the remainder of the filmstrip from the cartridge. A tension sensing device responds to the increase in the film tension, or a current detecting circuit responds to the increase in the motor current, by reversing the motor drive to rotate the supply spool inside the cartridge. The rotated spool draws the exposed frames off the take-up spool and rewinds them into the cartridge.

Alternatively, in place of a tension sensing device or a current detecting circuit, a perforation sensor may provided for detecting a turn-around perforation in the trailing end portion of the filmstrip to initiate return of the filmstrip from the take-up spool to the cartridge.

SUMMARY OF THE INVENTION

A film transport mechanism for a camera comprising drive means for advancing a filmstrip beginning with a leading end portion along a defined film path from a film cartridge, and a perforation sensor for detecting a turn-around perforation in a trailing end portion of the filmstrip to initiate return of the filmstrip along the defined film path to the film cartridge, is characterized in that:

the perforation sensor has a sensing position in the defined film path to be received in the turnaround perforation when the turn-around perforation is advanced to the perforation sensor;

a film divertor has a diverting position in the defined film path to direct a forward edge of the leading end portion of the filmstrip over the perforation sensor; and film presence sensing means is located to sense the forward edge of the filmstrip after the film divertor directs the forward edge over the perforation sensor, for retracting the film divertor from the defined film path to allow the perforation sensor to be received in the turn-around perforation.

DETAILED DESCRIPTION OF THE INVENTION

The invention is disclosed as being embodied preferably in a still-picture camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
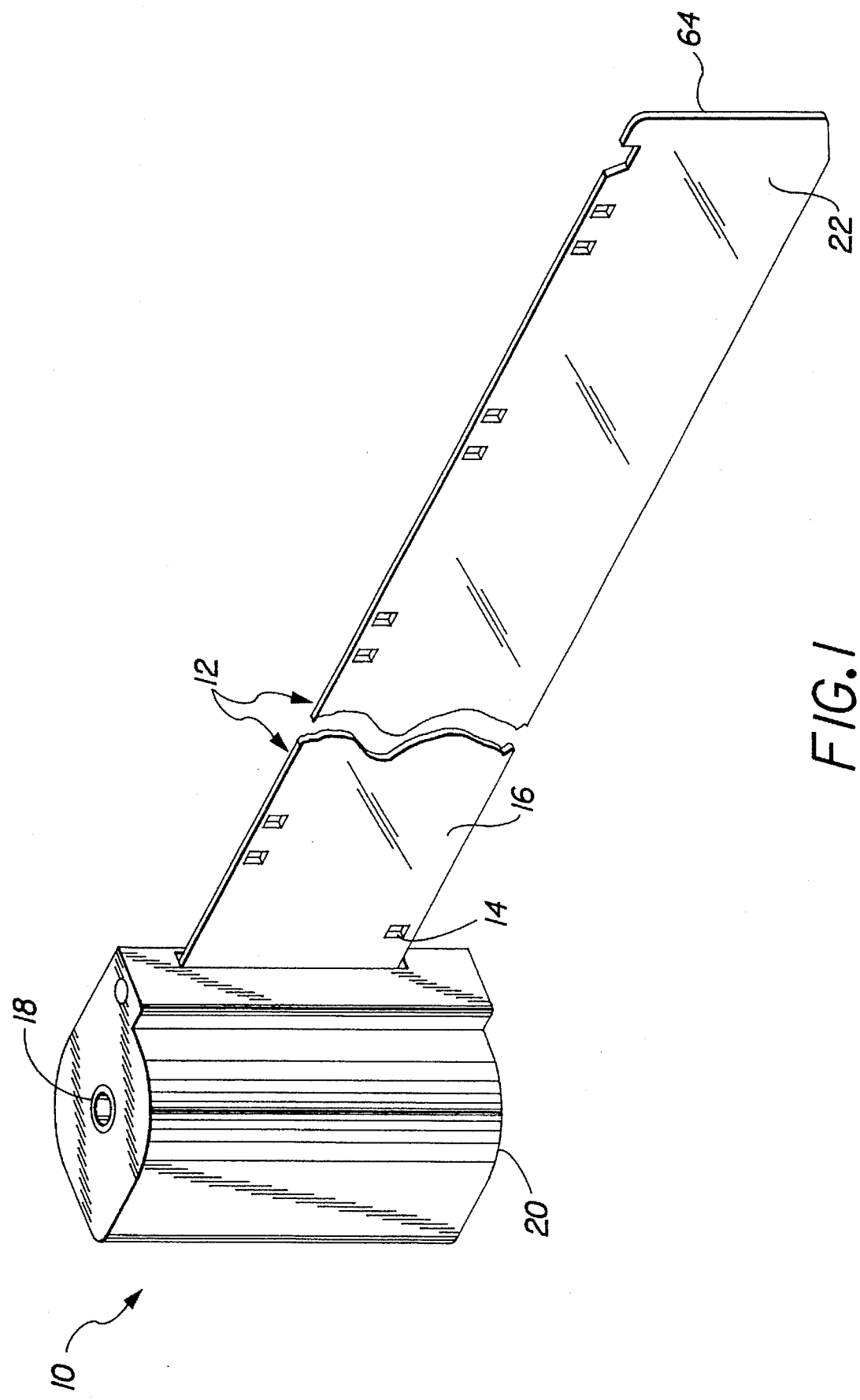
FIG. 1 is a perspective view of a film cartridge provided with a filmstrip having a turn-around perforation in a trailing end portion of the filmstrip.

Referring now to the drawings, FIG. 1 depicts a film cartridge 10 provided with a filmstrip 12 having a turn-around perforation 14 in a trailing end portion 16 of the filmstrip. The film cartridge 10 is similar to those disclosed in U.S. Pat. No. 5,305,504, issued Apr. 19, 1994, and No. 5,296,887, issued Mar. 22, 1994, in that unwinding rotation of a film supply spool 18 inside the cartridge housing 20 serves to advance or thrust the filmstrip 12 beginning with a leading end portion 22 from the cartridge interior.

Figure 2:
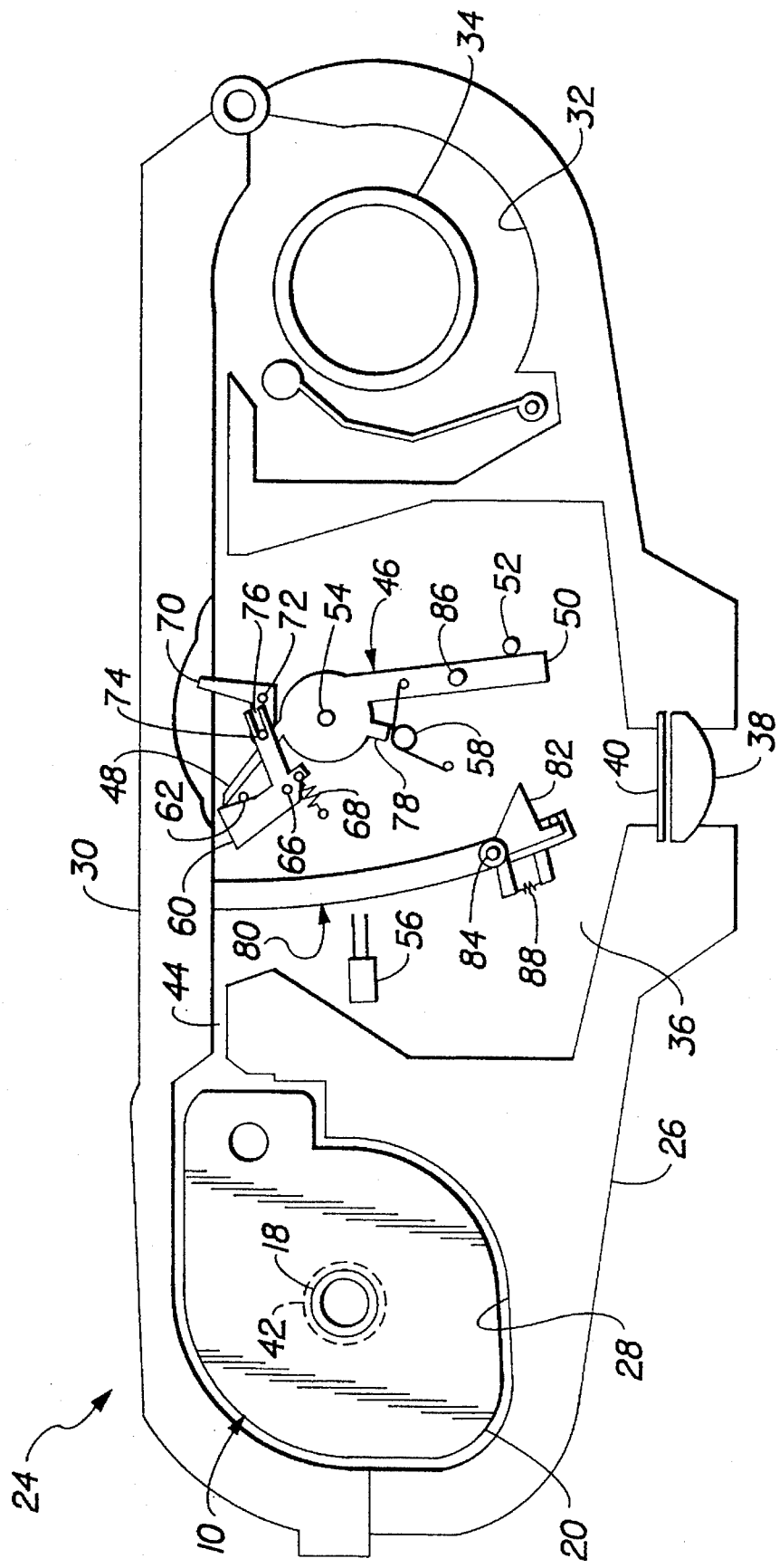
FIGS. 2–4 are schematic views of a camera provided with a film transport mechanism comprising a film take-up spool rotated to advance the filmstrip from the film cartridge onto a take-up spool, and a perforation sensor for detecting the turn-around perforation to initiate return of the filmstrip from the take-up spool to the film cartridge, which depict operation of the film transport mechanism.
Figure 3:
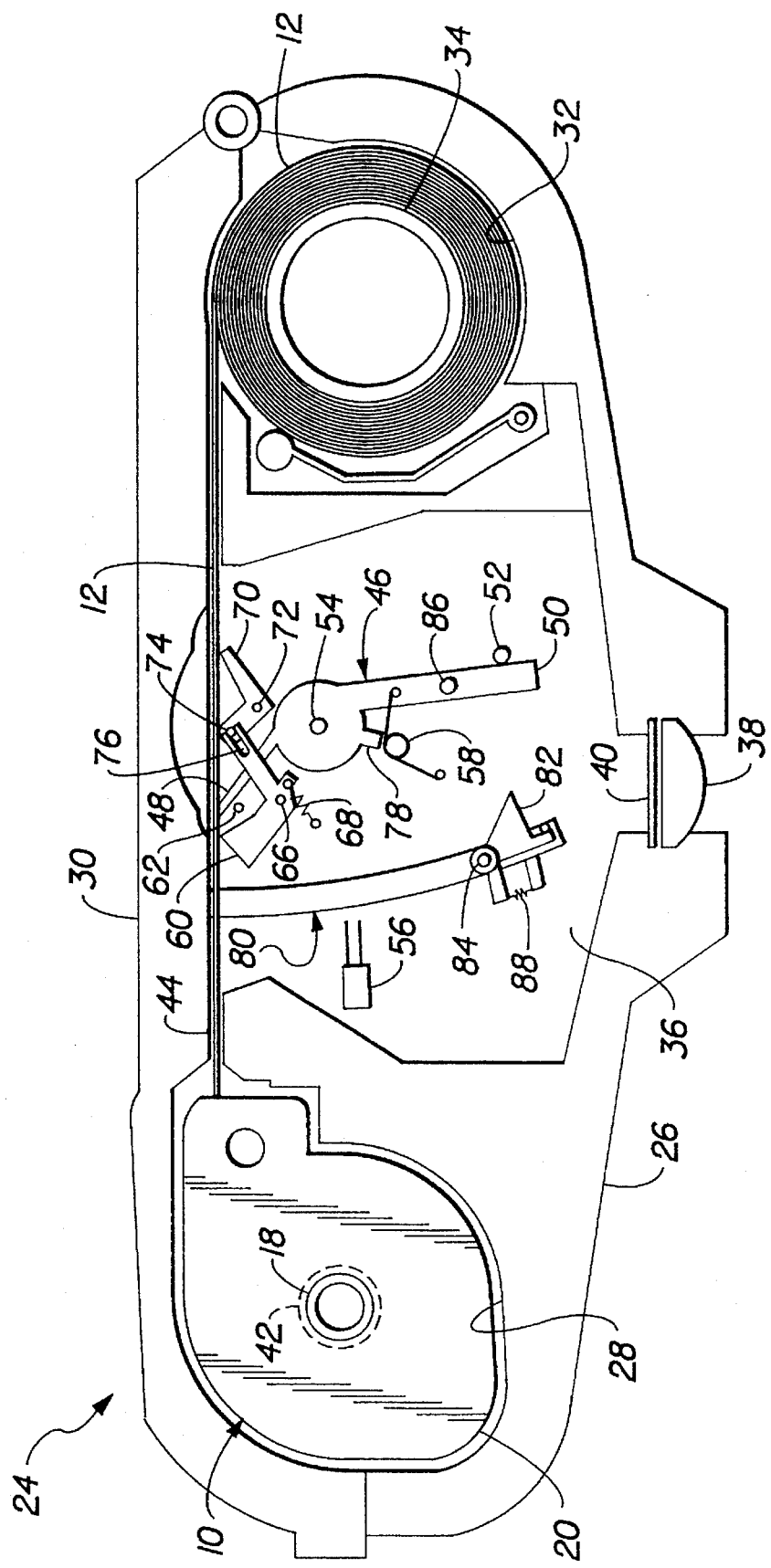
Figure 4:
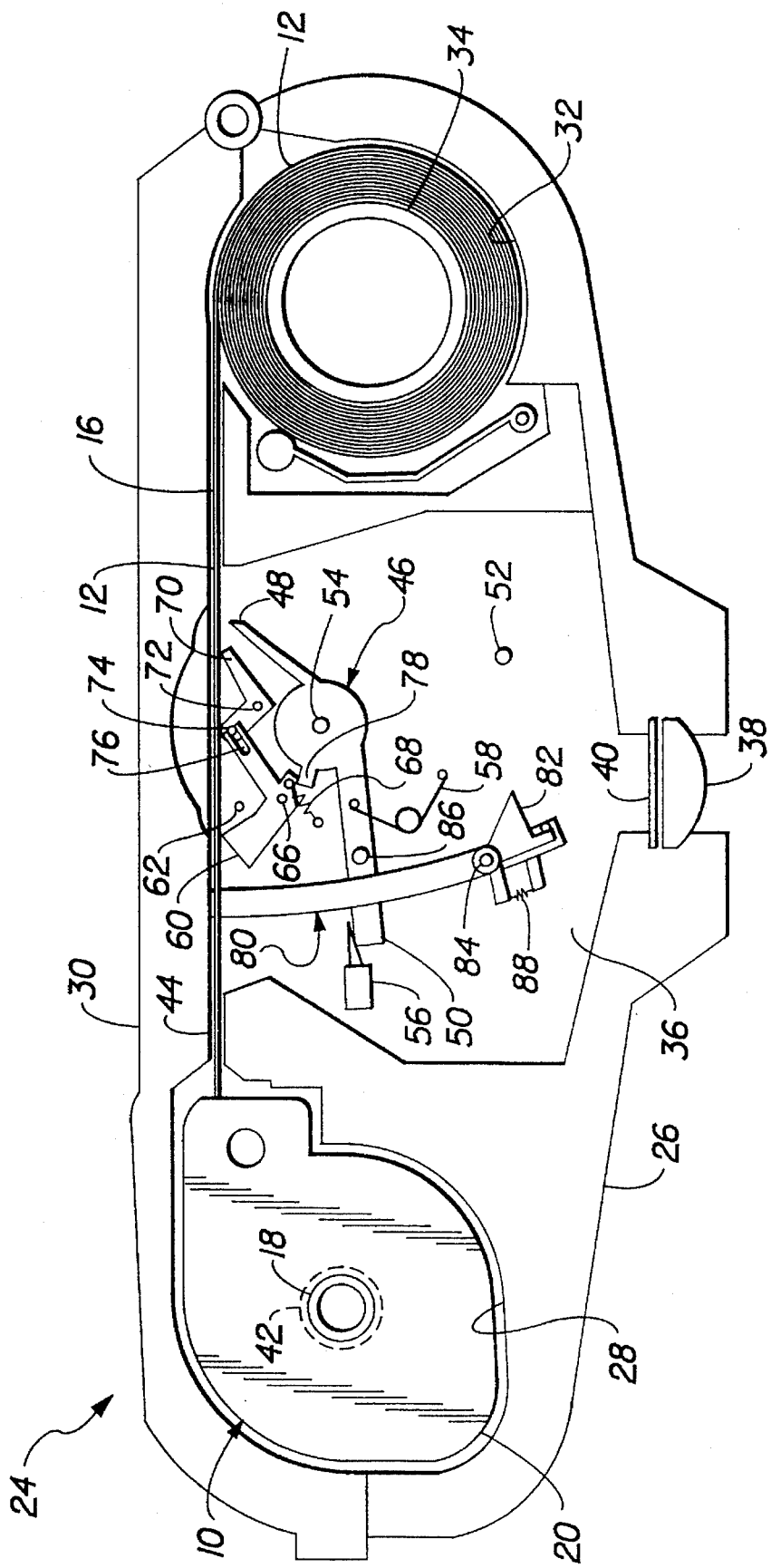

FIGS. 2–4 depict a still-picture camera 24 having a camera body 26. The camera body 26 as is typical includes a loading chamber 28 for receiving the film cartridge 10 when a rear door 30 of the camera body is open, a take-up chamber 32 containing a rotatably supported film take-up spool 34, and a back frame opening 36 in which successive frames of the filmstrip are exposed via a taking lens 38 and a shutter 40. A rotation hub 42 projects into the loading chamber 28 to engage the film supply spool 18. In operation, the rotation hub 42 provides motor-driven unwinding rotation of the film supply spool 18 to advance the filmstrip 12 beginning with its leading end portion 22 from the cartridge interior, along a defined film path 44 including across the back frame opening 36, and onto the take-up spool 34. Motor-driven unwinding rotation of the film supply spool 18 is then discontinued, and motor-driven winding rotation of the take-up spool 34 prewinds the filmstrip 12 except for its trailing end portion 16 onto the take-up spool before any exposures are made. During picture-taking, after each exposure is made, motor-driven winding rotation of the film supply spool 18 returns the exposed frame along the defined film path 44 to the cartridge housing 20.

Alternatively, only the leading end portion 22 of the filmstrip 12 need be wound onto the take-up spool 34. Then, during picture-taking, after each exposure is made, motor-driven winding rotation of the take-up spool 34 winds the exposed frame onto the take-up spool. When the filmstrip 12 except for its trailing end portion 16 is exposed, motor-driven winding rotation of the film supply spool 18 returns the filmstrip along the defined film path 44 to the cartridge housing 20.

As shown in FIGS. 2 and 3, a perforation sensor 46 has a sensing position in which a sensing end 48 of the perforation sensor protrudes into the defined film path 44 and another end 50 of the perforation sensor rests against a fixed stop 52. The sensing end 48 is tapered to be able to be received in the turnaround perforation 14 in the trailing end portion 16 of the filmstrip 12 when the turn-around perforation is advanced from the cartridge housing 20 along the defined film path 44 to the sensing end. The perforation sensor 46 is supported on a pivot pin 54 to be pivoted in a clockwise direction as viewed in FIG. 2 from its sensing position shown in FIGS. 2 and 3 to a retracted position shown in FIG. 4. In the retracted position, the sensing end 48 is removed from the defined film path 44 and the other end 50 closes a normally open switch 56. Also, the perforation sensor 42 is supported to be pivoted in a counter-clockwise direction as viewed in FIG. 4 from its retracted position shown in FIG. 4 to its sensing position shown in FIGS. 2 and 3. A known type overcenter spring 58 has one leg end connected to the perforation sensor 46 and another leg end connected to the camera body 26 to alternatively pivot the perforation sensor in the clockwise and counter-clockwise directions to its sensing and retracted positions.

A film divertor 60 has a diverting position shown in FIG. 2 in the defined film path 44 and against a fixed stop 62, to direct a forward edge 64 of the leading end portion 22 of the filmstrip 12 over the sensing end 48 of the perforation sensor 46 when the perforation sensor is in its sensing position and the filmstrip is advanced along the defined film path from the cartridge housing 20. The film divertor 60 is supported on a pivot pin 66 to permit a return spring 68 to urge the film divertor in a clockwise direction as viewed in FIG. 2 to its diverting position. The fixed stop 62 prevents the film divertor 60 from being pivoted in the clockwise direction by the filmstrip 12 as its forward edge 64 is advanced against the divertor.

A film presence sensor 70 has a sensing position shown in FIG. 2 in the defined film path 44, to be displaced from the defined film path by the forward edge 64 of the leading end portion 22 of the filmstrip 12 moving against the film presence sensor as the filmstrip is advanced along the defined film path form the cartridge housing 20. The film presence sensor 70 is supported on a pivot pin 72 and has a stud 74 which resides in a slot 76 in the film divertor 60. When the film presence sensor 70 is displaced from the defined film path 44 by the forward edge 64 of the filmstrip 12 as shown in FIG. 3, the film presence sensor is pivoted in a clockwise direction as viewed in FIG. 3 to make the stud 74 in the slot 76 pivot the film divertor 60 in an opposite direction to retract the film divertor from the defined film path 44. The film divertor 60 is retracted sufficiently to be spaced from the defined film path 44.

Then, when the perforation sensor 46 is in its sensing position shown in FIG. 3 and the filmstrip 12 is advanced sufficiently to locate the turn-around perforation 14 opposite the sensing end 48 of the perforation sensor, the sensing end is received in the turn-around perforation; whereupon, further advance of the filmstrip 12 in engagement with the sensing end pivots the perforation sensor in a clockwise direction as viewed in FIG. 3 to enable the overcenter spring 58 to pivot the perforation sensor in the same direction to its retracted position shown in FIG. 4. In the retracted position, the sensing end 48 of the perforation sensor 46 is removed from the defined film path 44 and the other end 50 of the perforation sensor closes the normally open switch 56 to initiate motor-driven winding rotation of the film supply spool 18 to return the exposed frame to the cartridge housing 20 after each exposure is made. As the perforation sensor 46 is pivoted in a clockwise direction as viewed in FIG. 3, a nub 78 on the perforation sensor pivots the film divertor 60 in a counter-clockwise direction to a retracted position further separated from the defined film path 44, and the stud 74 in the slot 76 makes the film presence sensor 70 pivot in a clockwise direction to a retracted position further separated from the defined film path. The respective retracted positions are shown in FIG. 4.

When the rear door 30 of the camera body 26 is opened, a resetting finger 80 projecting inwardly from the door is partially retracted from the camera body 26, and an actuator 82 mounted on the finger via a pivot pin 84 is pivoted beneath a stud 86 on the perforation sensor 46 contrary to the urging of a return spring 88. Conversely, when the door 30 is closed, the actuator 82 (rather than being pivoted beneath the stud 86) pushes against the stud to pivot the perforation sensor 46 in a counter-clockwise direction as viewed in FIG. 4 to enable the overcenter spring 58 to pivot the perforation sensor in the same direction to its sensing position shown in FIG. 2. Since the nub 78 is removed from the film divertor 60, the return spring 68 pivots the film divertor in a clockwise direction as viewed in FIG. 4 from its retracted position shown in FIG. 4 to its diverting position shown in FIG. 2. Similarly, the pin 74 in the slot 76 makes the film presence sensor 70 pivot in a counter-clockwise direction as viewed in FIG. 4 from its retracted position shown in FIG. 4 to its sensing position shown in FIG. 2.

The invention has been described with reference to a preferred embodiment. However, it will be appreciated that variations and modifications can be effected by a person of ordinary skill in the art without departing from the scope of the invention.

PARTS LIST 10. film cartridge
12. filmstrip
14. turn-around perforation
16. trailing end portion
18. film supply spool
20. cartridge housing
22. leading end portion
24. still-picture camera
26. camera body
28. loading chamber
30. rear door
32. take-up chamber
34. film take-up spool
36. back frame opening
38. taking lens
40. shutter
42. rotation hub
44. defined film path
46. perforation sensor
48. sensing end
50. other end
52. fixed stop
54. pivot pin
56. switch
58. overcenter spring 60. film divertor
62. fixed stop
64. forward edge
66. pivot pin
68. return spring
70. film presence sensor
72. pivot pin
74. stud
76. slot
78. nub
80. resetting finger
82. actuator
84. pivot pin
86. stud
88. return spring

I claim:

1. A film transport mechanism for a camera comprising drive means for advancing a filmstrip beginning with a leading end portion along a defined film path from a film cartridge, and perforation sensor means located only for detecting a non-metering turn-around perforation in a trailing end portion of the filmstrip, is characterized in that:

said perforation sensor means has a sensing position in the defined film path to be received in the non-metering turn-around perforation when the non-metering turn-around perforation is advanced to the perforation sensor;

a film divertor has a diverting position in the defined film path to direct a forward edge of the leading end portion of the filmstrip over said perforation sensor means when the perforation sensor means is in its sensing position in the defined film path; and film presence sensing means is located to sense the forward edge of the filmstrip after said film divertor directs the forward edge over said perforation sensor means, for retracting the film divertor from the defined film path to allow the perforation sensor means to be received in the turn-around perforation.

2. A film transport mechanism as recited in claim 1, wherein said film presence sensing means is supported in the defined film path to sense the forward edge of the filmstrip and to be displaced from the defined film path to retract said film divertor from the defined film path responsive to the forward edge of the filmstrip being advanced against the film presence sensing means.

3. A film transport mechanism as recited in claim 2, wherein said perforation sensor means is supported to be pivoted in a first direction to its sensing position and to be pivoted in a reverse direction to a retracted position removed from the turn-around perforation, and an overcenter spring is connected to said perforation sensor means to alternatively pivot the perforation sensor means in the first and reverse directions to its sensing and retracted positions.

4. A film transport mechanism as recited in claim 3, wherein said perforation sensor means is supported to be pivoted in the reverse direction as the filmstrip is advanced with the perforation sensor means received in the turn-around perforation to enable said overcenter spring to pivot the perforation sensor to its retracted position.

5. A film transport mechanism as recited in claim 4, wherein said perforation sensor means includes actuation means for moving said film presence sensing means to substantially space the film presence sensing means from the defined film path when said overcenter spring pivots the perforation sensor to its retracted position.

6. A film transport mechanism as recited in claim 4, wherein normally open switch means is located to be closed by said perforation sensor means to initiate reverse of the filmstrip to the film cartridge when the perforation sensor means is moved to its retracted position.

7. A film transport mechanism as recited in claim 3, wherein resetting means is actuated responsive to movement of a door of the camera which normally covers the film cartridge for moving said perforation sensor means in the first direction from its retracted position to enable said overcenter spring to move the perforation sensor means to its sensing position.

8. A film transport mechanism as recited in claim 1, wherein a fixed stop is located to prevent said film divertor from being moved out of its diverting position by the filmstrip when the forward edge of the filmstrip is advanced against the film divertor.

* * * * *